(12) United States Patent
Nishikawa et al.

(10) Patent No.: US 6,916,540 B2
(45) Date of Patent: Jul. 12, 2005

(54) LAMINATE AND ANTIREFLECTION FILM COMPRISING THE SAME

(75) Inventors: Akira Nishikawa, Tokyo (JP); Hiroomi Shimomura, Tokyo (JP)

(73) Assignee: JSR Corporation, Tokyo (JP)

(*) Notice: Subject to any disclaimer, the term of this patent is extended or adjusted under 35 U.S.C. 154(b) by 141 days.

(21) Appl. No.: 10/108,395

(22) Filed: Mar. 29, 2002

(65) Prior Publication Data

US 2002/0197485 A1 Dec. 26, 2002

(30) Foreign Application Priority Data

Mar. 30, 2001 (JP) ........................................ 2001-098113

(51) Int. Cl.[7] .......................... B32B 27/40; B32B 27/26
(52) U.S. Cl. .................. 428/423.9; 428/423.1
(58) Field of Search .......................... 428/423.1, 423.3, 428/423.9, 425.9; 522/90, 93; 525/458, 920

(56) References Cited

U.S. PATENT DOCUMENTS

| 5,384,190 A | | 1/1995 | Kaburaki | |
| 5,446,339 A | * | 8/1995 | Kinoshita et al. | ............ 313/478 |
| 5,580,496 A | | 12/1996 | Yukinobu et al. | |
| 5,731,119 A | * | 3/1998 | Eichorst et al. | ................ 430/63 |
| 5,955,512 A | * | 9/1999 | Numazawa et al. | ........... 522/95 |
| 5,958,638 A | * | 9/1999 | Katayama et al. | ............. 430/65 |

FOREIGN PATENT DOCUMENTS

| EP | 0585819 | * | 8/1993 | ............ H01J/29/86 |
| EP | 0 585 819 | | 3/1994 | |
| EP | 0 656 258 | | 6/1995 | |
| JP | 8-094806 | | 4/1996 | |
| JP | 8-231222 | | 9/1996 | |
| JP | 8-319118 | | 12/1996 | |
| JP | 9-012314 | | 1/1997 | |
| TW | 247943 | | 5/1995 | |
| WO | WO 00/47666 | | 8/2000 | |

* cited by examiner

*Primary Examiner*—Thao T. Tran
(74) *Attorney, Agent, or Firm*—Oblon, Spivak, McClelland, Maier & Neustadt, P.C.

(57) ABSTRACT

A antireflection laminate having a first layer formed on the outermost side and a second layer formed under the first layer. The second layer contains a needle-like antimony-containing tin oxide and may be a cured product prepared by curing an organic solvent type curable composition containing the needle-like antimony-containing tin oxide; a reaction product of a hydroxyl group-containing polyfunctional (meth)acrylate and a diisocyanate; a polyfunctional (meth)acrylate; and photoinitiator.

23 Claims, 1 Drawing Sheet

FIG. 1

LAMINATE AND ANTIREFLECTION FILM COMPRISING THE SAME

BACKGROUND OF THE INVENTION

1. Field of the Invention

The present invention relates to a laminate having high antistatic properties and high transparency and to an antireflecting film comprising the laminate.

2. Description of the Related Art

In various display panels including liquid crystal display panels, cold cathode ray tube panels and plasma displays, in order to prevent the reflection of external light and to improve image quality, laminates are required to have low reflectivity, antistatic properties, low haze and further good antiscratching properties represented by anti-steel wool properties.

JP-A-8-94806 discloses an antireflecting film prepared by laminating a high-refractive index film in which fine particles are localized in a high-refractive index binder resin and a low-refractive index film made of a fluorine type copolymer in this order on a substrate.

To state in more detail, in the formation of the high-refractive index film, a layer of fine particles such as metal oxide particles is formed in advance on process paper. The resultant paper is then pressed to the high-refractive index binder resin on the substrate to embed the fine particle layer in the high-refractive index binder resin, thereby allowing the fine particles to be localized.

Also, for the low-refractive index film, a resin composition comprising a fluorine-containing copolymer of vinylidene fluoride and hexafluoropropylene, a polymerizable compound having an ethylenic unsaturated group and a polymerization initiator is cured to form a thin film.

On the other hand, a fine powder of a needle-like metal oxide is disclosed in JP-A-8-231222, JP-A-8-319118 and JP-A-9-12314. However, an antireflecting film using such fine powder is not disclosed.

Conventionally, metal oxide particles contained in the laminate have a globular form as shown in JP-A-8-94806. In general, any consideration is not given to its shape and electroconductivity in general, offering the problems of insufficient antistatic properties and transparency of the laminate.

SUMMARY OF THE INVENTION

In view of this situation, the inventors of the present invention have conducted earnest studies and, as a result, found that the aforementioned problem can be solved by containing needle-like metal oxide particles in a second layer in a laminate comprising a first layer formed on the outermost side and the second layer formed under the first layer.

Specifically, it is an object of the present invention to provide a laminate having superior antistatic properties, antiscratching properties and transparency in a simple structure, and an antireflecting film comprising the laminate.

According to the present invention, there is provided a laminate comprising: a first layer formed on the outermost side, and a second layer formed under said first layer, said second layer comprising a needle-like antimony-containing tin oxide, whereby the aforementioned problem can be solved.

Here, the second layer may be laid below the first layer and other layers may be interposed between the first layer and the second layer.

By containing a needle-like antimony-containing tin oxide in the second layer, the laminate can have superior antistatic properties, antiscratching properties and transparency.

Also, in the structure of the present invention, the second layer is preferably a cured product prepared by curing an organic solvent type curable composition containing the following compounds (A-1) to (D) in all solids, the total solid concentration of the composition being 0.5 to 75%:

(A-1) 40 to 80% by weight of the needle-like antimony-containing tin oxide;

(B) 5 to 40% by weight of a reaction product of a hydroxyl group-containing polyfunctional (meth)acrylate and a diisocyanate;

(C) 5 to 30% by weight of a polyfunctional (meth)acrylate; and (D) 0.5 to 10% by weight of a photoinitiator.

Here, the "total solid content" is the content of a residue obtained when the curable composition was dried using a 120° C. hot plate for one hour.

Such a structure makes it possible to easily obtain a laminate having high antistatic properties, antiscratching properties and transparency.

In the structure according to the present invention, the second layer is preferably a cured product prepared by curing an organic solvent type curable composition containing the following compounds (A-2) to (D) in all solids, the content of the needle-like antimony-containing tin oxide being 40 to 80% by weight of all the solids, the total solid concentration of the composition being 0.5 to 75%:

(A-2) 40 to 89.5% by weight of a surface-treated needle-like antimony-containing tin oxide;

(B) 5 to 40% by weight of a reaction product of a hydroxyl group-containing polyfunctional (meth)acrylate and a diisocyanate;

(C) 5 to 30% by weight of a polyfunctional (meth)acrylate; and (D) 0.5 to 10% by weight of a photoinitiator.

The surface treatment of needle-like antimony-containing tin oxide can improve the antiscratching properties of the cured product.

Also, the limitation on the content of needle-like antimony-containing tin oxide in surface treated needle-like antimony-containing tin oxide makes it possible to surely obtain a laminate having high antistatic properties, antiscratching properties and transparency.

In the structure of the laminate of the present invention, the surface treatment preferably comprises combining the needle-like antimony-containing tin oxide with an organic compound having a polymerizable unsaturated group.

By the use of such needle-like antimony-containing tin oxide combined with the organic compound having a polymerizable unsaturated group, the dispersibility of needle-like antimony-containing tin oxide in the curable composition can be improved. Further, the bonding strength with other components contained in the curable composition can be enhanced by means of the polymerizable unsaturated group of the organic compound bound on the surface of needle-like antimony-containing tin oxide, when the composition is cured.

Also, in the structure of the laminate of the present invention, the compound (D) preferably contains at least 1-hydroxycyclohexyl phenyl ketone.

By containing such a photoinitiator, the curable composition can be more firmly cured.

The aforementioned laminate of the present invention has superior antistatic properties, antiscratching properties and transparency. They may be thus used for antireflecting films, antisoiling films, water-repellent films, electronic parts, optical parts, packaging containers or antistatic films.

The laminate of the present invention has a high antistatic effect. Specifically, the laminate has low surface resistance. The lower the surface resistance is, the higher the antistatic ability is. If the surface resistance is lower than the order of $10^{12}$ Ω/□, the antistatic ability is particularly increased, thereby preventing adhesion of dusts or the like significantly. The surface resistance is preferably lower than the order of $10^{10}$ Ω/□ in view of antistatic ability.

Also, the laminate of the present invention has high antiscratching properties and adhesiveness.

Moreover, the laminate of the present invention can obtain a desired antistatic effect by adding only a smaller amount of antimony-containing tin oxide as compared with a conventional laminate containing a globular antimony-containing tin oxide. This reason is that because an antimony-containing tin oxide has a needle form, a conductive path can be effectively formed in the cured product even by adding it in a small amount. Therefore, the content of antimony-containing tin oxide in the laminate is decreased, so that the transparency is improved.

Also, in another embodiment, the present invention provides an antireflecting film comprising the aforementioned laminate and the first layer is a low-refractive index film and the second layer is a high-refractive index film.

If the laminate of the present invention is used for the antireflecting film, the aforementioned superior antistatic properties, antiscratching properties and transparency can be exhibited.

Also, in the structure of the antireflecting film of the present invention, the low-refractive index film is preferably constituted of a compound containing a fluorine atom.

By the selection of such a structural material as the low-refractive index film, a high antireflective effect can be obtained.

Also, in the structure of the antireflecting film of the present invention, the antireflecting film preferably comprises a hardcoat layer and a substrate below the high-refractive index film.

By the hardcoat layer and the substrate, the high-refractive index film can be more firmly fixed.

According to the present invention, in the laminate comprising the first layer formed on the outermost side and the second layer formed under the first layer, by containing a needle-like antimony-containing tin oxide in the second layer, a laminate having superior antistatic properties, antiscratching properties and transparency can be provided.

Further, according to the present invention, if such a laminate is applied to an antireflecting film, an antireflecting film exhibiting superior antistatic properties, antiscratching properties and transparency can be provided by a simple structure.

DESCRIPTION OF THE PREFERRED EMBODIMENTS

Each compound of the organic solvent type curable composition (hereinafter referred to as a curable composition as the case may be) to be used for the laminate or antireflecting film of the present invention and a method of curing the composition will be hereinafter explained.

1. Compound (A-1), Needle-like Antimony-containing Tin Oxide

A needle-like antimony-containing tin oxide (hereinafter referred to as an ATO as the case may be) is used to improve the antistatic properties of the cured product obtained by curing the curable composition.

(1) Shape

No particular limitation is imposed on the shape of needle-like ATO as far as an ATO has a micropowdery long shape including a fiber form, a columnar form, a bar form and other analogous forms.

An aspect ratio is preferably 5 or more and more preferably 10 or more.

For example, a minor-axis average particle diameter is 0.005 to 0.05 μm, a major-axis average particle diameter is 0.1 to 3 μm and an average aspect ratio is 5 or more.

The shape of needle-like ATO can be properly selected according to a desired properties, dispersibility in the curable composition and the like.

(2) Production Method

Although no particular limitation is also imposed on a method of producing a needle-like ATO, examples of the method include a method in which a material product which contains a tin component, an antimony component, a silicon component and a halide of an alkali metal is baked and then soluble salts of the resulting baked material are removed; and a method in which antimony hydroxide is deposited on the particle surface of a needle tin oxide fine powder, the mixture is subjected to fractional extraction and then the extract is baked.

(3) Additional Amount

In the curable composition to be used in the present invention, it is necessary that the additional amount of needle-like ATO is within a range from 40 to 80% by weight.

This is because when the amount of needle-like ATO to be added is less than 40% by weight, superior antistatic properties and antiscratching properties may not be obtained when the composition is cured whereas when the amount exceeds 80% by weight, coatability may be insufficient when the curable composition is applied and dried and the case where the transparency of the cured product may be decreased.

Also, from the aforementioned reason, the amount to be added is preferably within a rage from 45 to 80% by weight and more preferably within a range from 50 to 80% by weight.

2. Compound (B), Reaction Product between a Hydroxyl Group-containing Polyfunctional (meth)acrylate and a Diisocyanate The reaction product (hereinafter referred to simply as a compound (B) as the case may be) between a hydroxyl group-containing polyfunctional (meth)acrylate and a diisocyanate is used to increase the antiscratching properties and hardness of the cured product obtained by curing the curable composition.

(1) Hydroxyl Group-containing Polyfunctional (meth)acrylate

No particular limitation is imposed on the hydroxyl group-containing polyfunctional (meth)acrylate and for example, dipentaerythritol penta(meth)acrylate, pentaerythritol tri(meth)acrylate, pentaerythritol di(meth)acrylate monostearate, isocyanuric acid EO-modified di(meth)acrylate or the like may be preferably used. The hydroxyl group-containing polyfunctional (meth)acrylate is commercially available as, for example, KAYARAD DPHA and PET-30 (trademark, manufactured by Nippon Kayaku Co., Ltd.), ARONIX M-215, M-233, M-305 and M-400 (trademark, manufactured by Toagosei Co., Ltd.) and the like.

These hydroxyl group-containing polyfunctional (meth) acrylates may be used either singly or in combinations of two or more.

(2) Diisocyanate

No particular limitation is imposed on a diisocyanate as far as it has an isocyanate group capable of reacting with the aforementioned hydroxyl group-containing polyfunctional (meth)acrylate. Examples of the diisocyanate may include 2,4-tolylenediisocyanate, 2,6-tolylenediisocyanate, 1,3-xylyenediisocyanate, 1,4-xylylenediisocyanate, 1,5-naphthalenediisocyanate, m-phenylenediisocyanate, p-phenylenediisocyanate, 3,3'-dimethyl-4,4'-diphenylmethanediisocyanate, 4,4'-diphenylmethanediisocyanate, 3,3'-dimethylphenylenediisocyanate, 4,4'-biphenylenediisocyanate, 1,6-hexanediisocyanate, isophoronediisocyanate, methylenebis(4-cyclohexylisocyanate), 2,2,4-trimethylhexamethylenediisocyanate, bis(2-isocyanateethyl)fumarate, 6-isopropyl-1,3-phenyldiisocyanate, 4-diphenylpropanediisocyanate, lysinediisocyanate, hydrogenated diphenylmethanediisocyanate, 1,3-bis(isocyanatemethyl) cyclohexane, tetramethylxylylenediisocyanate and 2,5 (or 6)-bis(isocyanatemethyl)-bicyclo[2.2.1]heptane. Among these compounds, 2,4-tolylenediisocyanate, isophoronediisocyanate, xylylenediisocyanate, methylenebis(4-cyclohexylisocyanate) and 1,3-bis (isocyanatemethyl)cyclohexane are more preferable.

These diisocyanates may be used either singly or in combinations of two or more.

(3) Embodiments of the Compound (B)

No particular limitation is imposed on the compound (B) as far as it is a compound obtained by reacting the aforementioned hydroxyl group-containing polyfunctional (meth)acrylate with the aforementioned diisocyanate. As the compound (B), those having at least two or more (meth) acryloyl groups in its molecule, wherein the molecular weight per (meth)acryloyl group is 400 or less and having two or more urethane bonds (—O—C(=O)—NH—) are preferable. Urethane(meth)acrylate which is represented by the following formula (1) and obtained by reacting one mol of a diisocyanate with 2 mol of the hydroxyl group-containing polyfunctional (meth)acrylate is more preferable.

R¹—OC(=O)NH—R²—NHCOO—R³      (1)

wherein the substituents R¹ and R³ respectively represent a monovalent organic group containing a (meth)acryloyl group derived from the hydroxyl group-containing polyfunctional (meth)acrylate and the substituent R² is a divalent organic group derived from the diisocyanate.

Examples of such a compound (B) include single products or combinations of a reaction product between dipentaerythritol penta(meth)acrylate and 1,6-hexamethylenediisocyanate, reaction product between dipentaerythritol penta(meth)acrylate and isophoronediisocyanate, reaction product between dipentaerythritol penta(meth)acrylate and 2,4-tolylenedisiocyanate, reaction product between pentaerythritol tri(meth)acrylate and 1,6-hexamethylenediisocyanate, reaction product between pentaerythritol tri(meth)acrylate and isophoronediisocyanate and reaction product between pentaerythritol tri(meth)acrylate and 2,4-tolylenediisocyanate.

Examples of a synthetic method include a method in which the diisocyanate and the hydroxyl group-containing polyfunctional (meth)acrylate are charged at the same time and reacted with each other, a method in which the hydroxyl group-containing polyfunctional (meth)acrylate is added dropwise to the isocyanate and the both are reacted with each other and a method in which the diisocyanate and the hydroxyl group-containing polyfunctional (meth)acrylate are charged in the same mols, the both are reacted with each other and then the hydroxyl group-containing polyfunctional (meth)acrylate is again reacted.

(4) Additional Amount

In the curable composition to be used in the present invention, it is necessary that the additional amount of the compound (B) is within a range from 5 to 40% by weight.

This is because when the amount is less than 5% by weight, the antiscratching properties of the cured product may be insufficient when the curable composition is cured, whereas when the amount exceeds 40% by weight, the hardness of the cured product may be insufficient.

Also, from the above reason, the amount of the compound (B) is preferably within a range from 10 to 30% by weight and more preferably within a range from 10 to 25% by weight.

3. Compound (C), Polyfunctional (meth)acrylate

The polyfunctional (meth)acrylate is used to improve the antiscratching properties and hardness of the cured product obtained by curing the curable composition.

(1) Polyfunctional (meth)acrylate

The polyfunctional (meth)acrylate is a compound containing at least two (meth)acryloyl groups in its molecule. Examples of the compound include single products or combinations of the aforementioned hydroxyl group-containing polyfunctional (meth)acrylate such as pentaerythritol tri(meth)acrylate and dipentaerythritol penta (meth)acrylate, dipentaerythritol hexa(meth)acrylate, trimethylolpropane tri(meth)acrylate, pentaerythritol tetra (meth)acrylate, trimethylolpropanetrioxyethyl(meth) acrylate and tris(2-hydroxyethyl)isocyanurate tri(meth) acrylate.

(2) Additional Amount

It is necessary that the additional amount of the polyfunctional (meth)acrylate is within a range from 5 to 30% by weight in the curable composition to be used in the present invention.

This reason is that when the amount is less than 5% by weight, the antiscratching properties of the cured product is insufficient when the curable composition is cured, whereas when the amount exceeds 30% by weight, only insufficient coatability may be obtained when the curable composition is applied and dried.

Also, from the above reason, the amount of the polyfunctional (meth)acrylate is preferably within a range from 5 to 30% by weight and more preferably within a range from 8 to 28% by weight.

The compounds (B) and (C) are both used to improve the antiscratching properties and hardness of the cured product obtained when the curable composition is cured. It is necessary to use the both together. The reason why the compounds (B) and (C) are added is to impart moderate elasticity to the cured film and to improve the antiscratching properties and hardness respectively and totally to impart elasticity and to improve the hardness. In order to exhibit the properties of the both, it is preferable to add the compounds (B) and (C) according to Claims.

4. Compound (D), Photoinitiator

The photoinitiator is used to cure the composition.

(1) Photoinitiator

Examples of the photoinitiator include single products or combinations of 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoinpropyl ether, benzoinethyl ether, benzyldimethylketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenylphosphine oxide and bis-(2,6-dimethoxybenzoyl)-2,4,4-trimethylpentylphosphine oxide.

Among these photoinitiators, 1-hydroxycyclohexyl phenyl ketone, 2,2-dimethoxy-2-phenylacetophenone, 2-methyl-1-[4-(methylthio)phenyl]2-morpholino-propan-1-one, 2,4,6-trimethylbenzoyldiphenylphosphine oxide and bis-(2,6-dimethoxybenzoyl)-2,4,4-trimethylpentylphosphine oxide are preferable.

It is to be noted that the curable composition particularly preferably contains at least 1-hydroxycyclohexyl-phenyl-ketone as the photoinitiator. Also, the content of 1-hydroxycyclohexyl-phenyl-ketone is preferably 1 to 5% by weight.

(2) Additional Amount

It is necessary that the additional amount of the photoinitiator is within a range from 0.5 to 10% by weight in the curable composition to be used in the present invention.

This is because when the amount is less than 0.5% by weight, the curable composition may be insufficiently cured, whereas when the amount exceeds 10% by weight, the photoinitiator itself may work as a plasticizer, decreasing the hardness of the cured product.

Also, from the above reason, the amount of the photoinitiator is preferably within a range from 0.5 to 8% by weight and more preferably within a range from 0.5 to 5% by weight.

5. Compound (A-2), Surface-treated Needle-like ATO

The surface-treated needle-like ATO is obtained by surface-treating the aforementioned needle-like ATO by using a surface-treating agent such as a coupling agent. The surface treatment more improves dispersibility. Here, the surface treatment means an operation of reforming the surface by mixing a needle-like antimony tin oxide with a surface-treating agent. Although any one of physical adsorption and a reaction for forming a chemical bond may be used as a method of the operation, the reaction for forming a chemical bond is preferable from the viewpoint of the effect of the surface treatment.

The content of the needle-like ATO in the surface treated needle-like ATO is 40 to 80% by weight in the total solid.

(1) Surface Treating Agent

When the surface treatment is carried out using a coupling agent, the following coupling agents are given as examples of the coupling agent.

(i) Organic Compounds having a Polymerizable Unsaturated Group

As the organic compound having a polymerizable unsaturated group which compound is to be combined with the needle-like ATO, alkoxysilane compounds having a urethane bond [—O—C(=O)NH—] or a thiourethane bond [—S—C(=O)NH—] and an unsaturated double bond in their molecules are preferable. Examples of the organic compound may include compounds represented by the following formula (2).

(2)

wherein $R^4$ and $R^5$, which may be the same or different, respectively represent a hydrogen atom or a $C_{1-8}$ alkyl group or aryl group and examples of $R^4$ or $R^5$ may include a methyl, an ethyl, a propyl, a butyl, an octyl, a phenyl or a xylyl group. Here, p represents an integer from 1 to 3.

Examples of the group represented by the formula $[(R^4O)_p R^5_{3-p}Si—]$ may include a trimethoxysilyl group, triethoxysilyl group, triphenoxysilyl group, methyldimethoxysilyl group and dimethylmethoxysilyl group. Among these groups, a trimethoxysilyl group, triethoxysilyl group or the like is preferable.

$R^6$ is a divalent organic group having a $C_1$–$C_{12}$ aliphatic group structure or an aromatic group structure and may contain a chain, branched or cyclic structure.

Also, $R^7$ is a divalent organic group and is usually selected from divalent groups having a molecular weight of 14 to 10000 and preferably 76 to 500.

$R^8$ is an organic group having (q+1) valences and is preferably selected from chain, branched or cyclic saturated hydrocarbon groups and unsaturated hydrocarbon groups.

Z represents a monovalent organic group having a polymerizable unsaturated group which enters into an intermolecular crosslinking reaction in the presence of active radical species. Also, q is preferably an integer from 1 to 20, more preferably an integer from 1 to 10 and particularly preferably an integer from 1 to 5.

The organic compound which has a polymerizable unsaturated group and is used in the present invention may be synthesized using, for example, the method described in the publication of JP-A-9-100111. To state in more detail, the organic compound is obtained by reacting a hydroxyl group-containing (meth)acrylate, alkoxysilane and a diisocyanate.

As the hydroxyl group-containing (meth)acrylate, dipentaerythritol penta(meth)acrylate, pentaerythritol tri(meth)acrylate, dipentaerythritol penta(meth)acrylate, pentaerythritol tri(meth)acrylate, pentaerythritol di(meth)acrylate monostearate, isocyanuric acid EO-modified di(meth)acrylate, hydroxyethyl (meth)acrylate, 2-hydroxypropyl (meth)acrylate, 2-hydroxy-3-phenoxypropyl(meth)acrylate or the like may be preferably used. The hydroxyl group-containing polyfunctional (meth)acrylate is commercially available as, for example, KAYARAD DPHA and PET-30 (trademark, manufactured by Nippon Kayaku Co., Ltd.), ARONIX M-215, M-233, M-305 and M-400 (trademark, manufactured by Toagosei Co., Ltd.) and the like.

No particular limitation is imposed on the alkoxysilane insofar as it has a functional group which reacts with a diisocyanate. For example, a thiol group-containing alkoxysilane such as γ-mercaptopropyltrimethoxysilane, γ-mercaptopropyltriethoxysilane, γ-mercaptopropyldimethoxysilane, γ-mercaptopropyldiethoxymethoxysilane, γ-mercaptopropyldimethoxymethylsilane or γ-mercaptopropyldiethoxymethylsilane is preferably used.

Moreover, no particular limitation is imposed on the compound used as diisocyanate as far as it has an isocyanate group which can react with the aforementioned polyfunctional (meth)acrylate and alkoxysilane. Examples of such a compound include 2,4-tolylenediisocyanate, 2,6-tolylenediisocyanate, 1,3-xylylenediisocyanate, 1,4-xylylenediisocyanate, 1,5-naphthalenediisocyanate, m-phenylenediisocyanate, p-phenylenediisocyanate, 3,3'-dimethyl-4,4'-diphenylmethanediisocyanate, 4,4'-diphenylmethanediisocyanate, 3,3'-dimethylphenylenediisocyanate, 4,4'-biphenylenediisocyanate, 1,6-hexanedilsocyanate, isophoronediisocyanate, methylenebis(4-cyclohexylisocyanate), 2,2,4-trimethylhexamethylenediisocyanate, bis(2-isocyanateethyl)fumarate, 6-isopropyl-1,3-phenyldiisocyanate, 4-diphenylpropanediisocyanate, lysinediisocyanate, hydrogenated diphenylmethanediisocyanate, 1,3-bis(isocyanatemethyl)cyclohexane, tetramethylxylylenediisocyanate and 2,5(or 6)-bis(isocyanatemethyl)-bicyclo[2.2.1]heptane. Among these compounds, 2,4-tolylenediisocyanate, isophoronediisocyanate, xylylenediisocyanate, methylenebis(4-cyclohexylisocyanate) and 1,3-bis(isocyanatemethyl)cyclohexane are more preferable.

The aforementioned alkoxysilanes and diisocyanates may be respectively used either singly or in combinations of two or more.

(ii) Other Coupling Agents

Examples of other coupling agents suitable for surface treatment include single products or combinations of a compound group having an unsaturated double bond in its molecule such as γ-methacryloxypropyltrimethoxysilane, γ-acryloxypropyltrimethoxysilane and vinyltrimethoxysilane, compound group having an epoxy group in its molecule such as γ-glycidoxypropyltriethoxysilane and γ-glycidoxypropyltrimethoxysilane, compound group having an amino group in its molecule such as γ-aminopropyltriethoxysilane and γ-aminopropyltrimethoxysilane, compound group having a mercapto group in its molecule such as γ-mercaptopropyltriethoxysilane and γ-mercaptopropyltrimethoxysilane, alkylsilanes such as methyltrimethoxysilane, methyltriethoxysilane and phenyltrimethoxysilane, tetrabutoxytitanium, tetrabutoxyzirconium and tetraisopropoxyaluminum.

Also, among these coupling agents, those having a functional group which copolymerize with an organic resin or enters into a crosslinking reaction with an organic resin are preferable.

(iii) Additional Amount

When a needle-like ATO is surface treated, the proportion of the surface treating agent is preferably 0.1 to 125 parts by weight, more preferably 1 to 100 parts by weight and still more preferably 5 to 50 parts by weight based on 100 parts by weight of the needle-like ATO.

This reason is that when the proportion of the surface treating agent to be added is less than 0.1 parts by weight, the antiscratching properties of the cured product may be insufficient whereas when the proportion exceeds 125 parts by weight, the hardness of the cured product may be insufficient.

(2) Additional Amount

In the curable composition to be used in the present invention, the amount of the surface-treated needle-like ATO is preferably within a range from 40 to 89.5% by weight in the total solid and the content of the needle-like ATO in the total solid is preferably within 40 to 80% by weight. It is desirable to control the amount of the surface-treated needle-like ATO such that it falls in the aforementioned preferable range.

6. Organic Solvent

In the curable composition to be used in the present invention, other than the above compounds (A-1) or (A-2) to (D), an organic solvent is preferably compounded.

Although no particular limitation is imposed on the organic solvent, it is preferable to use at least one organic solvent selected from the group consisting of ketones such as methyl ethyl ketone, methyl isobutyl ketone, cyclohexanone and acetylacetone, alcohols such as ethanol, isopropyl alcohol, n-butanol and diacetone alcohol, ether group-containing alcohols such as ethyl cellosolve, butyl cellosolve and propylene glycol monomethyl ether, hydroxyesters such as methyl lactate, ethyl lactate and butyl lactate, β-ketoesters such as ethyl acetoacetate, methyl acetoacetate and butyl acetoacetate and aromatic hydrocarbons such as toluene and xylene. Among these compounds, ketones such as methyl ethyl ketone, methyl isobutyl ketone, cyclohexanone and acetylacetone are more preferable.

The organic solvent is added such that the total solid content of the curable composition is 0.5 to 75%. Specifically, the amount of the organic solvent to be added is preferably 33.3 to 19900 parts by weight when the total solid content is defined as 100 parts by weight.

This reason is that when the additional amount of the organic solvent is less than 33.3 parts by weight, the viscosity of the curable composition may be increased, lowering coatability, whereas when the amount exceeds 19900 parts by weight, the film thickness of the resulting cured product becomes so thin that the antiscratching properties may be exhibited.

7. Others

The curable composition to be used in the present invention may further contain additives such as photosensitizers, polymerization inhibitors, polymerization initiator adjuvants, leveling agents, wettability improvers, surfactants, plasticizers, ultraviolet absorbers, antioxidants, antistatic agents, inorganic fillers, pigments and dyes to the extent the object and effect of the present invention are not impaired.

8. Method for the Preparation of the Curable Composition

The curable composition to be used in the present invention may be prepared by compounding the aforementioned compounds (A-1) (or (A-2)) to (D), an organic solvent and, as required, additives and by mixing these components at ambient temperature or under heating. Specifically, the composition may be prepared using a mixing machine such as a mixer, kneader, ball mill, three-roll or the like. When the components are mixed under heating, the operation is preferably performed at a temperature lower than the decomposition initiation temperature of the polymerization initiator. Also, when a thin film 1 μm or less in thickness is formed, the curable composition may be diluted with an organic solvent prior to application and then applied.

9. Requirements for the Curing of the Curable Composition

Although no particular limitation is imposed on the requirements for the curing of the curable composition, the exposure amount is preferably designed to be in a range from 0.01 to 10 J/cm$^2$ in the case of using, for example, radiation.

This reason is that when the exposure amount is less than 0.01 J/cm$^2$, curing inferiors may be caused, whereas when the exposure amount exceeds 10 J/cm$^2$, curing time may be made excessively long.

From the above reason, the exposure amount is designed to be in a range preferably from 0.1 to 5 J/cm$^2$ and more preferably from 0.3 to 3 J/cm$^2$.

Figure 1:
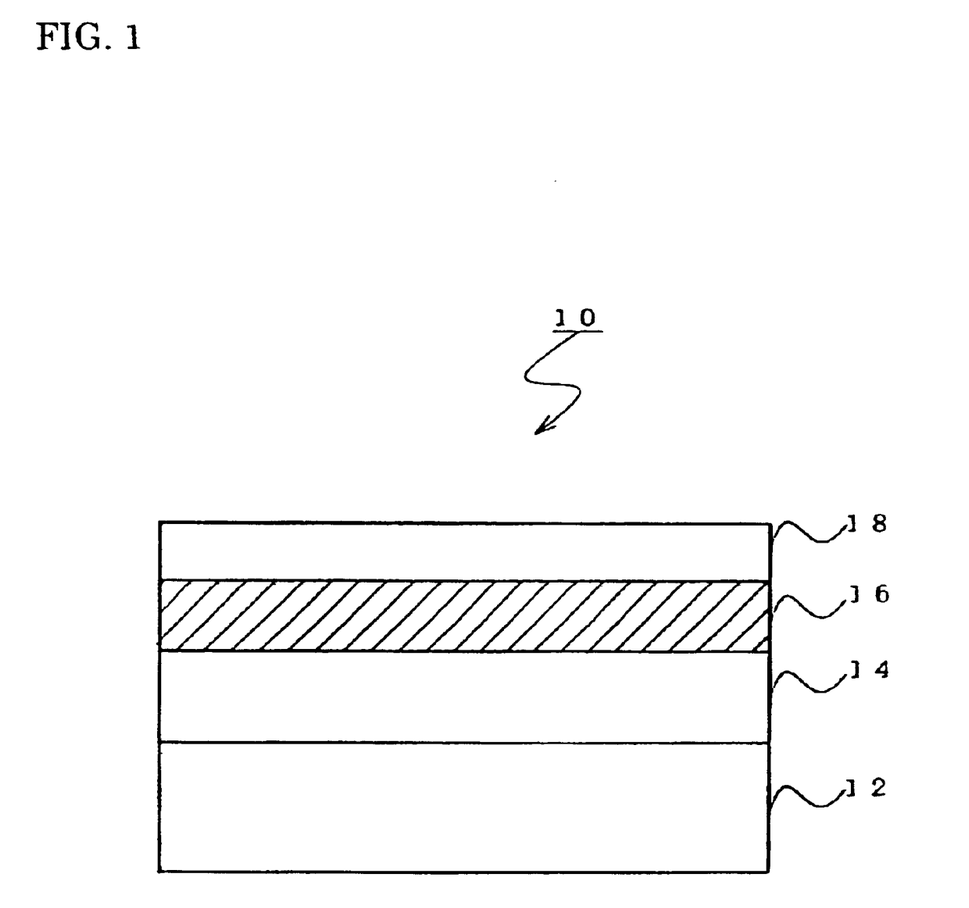
FIG. 1 is a sectional view of an antireflecting film in one embodiment according to the present invention.

Each layer of the antireflecting film of the present invention will be hereinafter explained. The antireflecting film of the present invention may comprise a hardcoat layer and a substrate below the low-refractive index film and high-refractive index film.

FIG. 1 shows such an antireflecting film 10. As shown in FIG. 1, a hardcoat layer 14, a high-refractive index film 16 and a low-refractive index film 18 are laminated on a substrate 12. At this time, the high-refractive index film 16 may be formed directly on the substrate 12 without forming the hardcoat layer 14.

Also, a medium-refractive index film (not shown) may be further disposed between the high-refractive index film 16 and the low-refractive index film 18 or between the high-refractive index film 16 and the hardcoat layer 14.

10. Low-refractive Index Film (1) Curable Composition 1 for the Low-refractive Index Film No particular limitation is imposed on a curable composition for the low-refractive index film, which composition is used to form the low-refractive index film. The composition preferably contains, as its major components, a single product or a combination of a fluorine type resin (including a fluorine compound), siloxane type resin (including a silicone resin and polysilazane), acrylic resin, polyester type resin, urethane type resin and the like.

The reason why these resins are used is that these resins can form a firm thin film as the low-refractive index film and as a result, improve the antiscratching properties of the low-refractive index film significantly. Also this is because these resins make it relatively easy to control the refractive index of the low-refractive index film.

(2) Curable Composition 2 for the Low-refractive Index Film

Any one of heatcurable and photocurable compositions may be used as the curable composition for the low-refractive index film, which composition is used to form the low-refractive index film. The composition is preferably a heatcurable composition containing fluorine because of easy productivity. As one example of such a fluorine-containing composition, a fluorine-containing composition comprising the following components (a) to (d) may be given.

(a) Fluorine-containing copolymer having a hydroxyl group;
(b) Heatcurable agent having a functional group which can react with a hydroxyl group;
(c) Curing catalyst; and
(d) Organic solvent.

(1) (a) Fluorine-containing Copolymer having a Hydroxyl Group

As the component (a), fluorine-containing copolymers having a hydroxyl group in the molecule may be preferably used. More concretely, the component (a) may be obtained by copolymerizing a monomer containing a fluorine atom with a monomer containing a hydroxyl group. Also, if necessary, it is desirable to add an ethylenic unsaturated monomer other than these monomers.

Examples of the monomer containing a fluorine atom include single products or combinations of tetrafluoroethylene, hexafluoropropylene, vinylidene fluoride, chlorotrifluoroethylene, trifluoroethylene, tetrafluoroethylene, (fluoroalkyl)vinyl ether, (fluoroalkoxyalkyl)vinyl ether, perfluoro(alkylvinyl ether), perfluoro(alkoxyvinyl ether) and fluorine-containing (meth)acrylate.

Although no particular restriction on the amount of the fluorine atom-containing monomer to be compounded, the amount is preferably in a range from 10 to 99 mol % and more preferably in a range from 15 to 97 mol %.

Also, examples of the hydroxyl group-containing monomer include single products or combinations of hydroxyethyl vinyl ether, hydroxypropyl vinyl ether, hydroxybutyl vinyl ether, hydroxypentyl vinyl ether, hydroxyhexyl vinyl ether, hydroxyethyl allyl ether, hydroxybutyl allyl ether, glycerol monoallyl ether, allyl alcohol and hydroxyethyl (meth)acrylate.

Although there is no particular limitation to the amount of the hydroxyl group-containing monomer to be compounded, the amount is preferably in a range from 1 to 20 mol % and more preferably in a range from 3 to 15 mol %.

(2) (b) Heatcurable Agent having a Functional Group which can React with a hydroxyl Group As the heatcurable agent (hereinafter referred to simply as a heatcurable agent as the case may be) having a functional group which can reacts with a hydroxyl group (hereinafter referred to simply as a heatcurable agent as the case may be), a melamine compound having a methylol group and an alkoxymethyl group or two or more of either one of these groups are preferably used.

More concretely, methylated melamine compounds such as a hexamethyl etherealized methylol melamine compound, hexabutyl etherealized methylol melamine compound, methylbutyl-mixed etherealized methylol melamine compound, methyl etherealized methylol melamine compound and butyl etherealized methylol melamine compound are more preferable.

Also, the amount of the heatcurable agent to be added is preferably in a range from 1 to 70 parts by weight based on 100 parts by weight of the fluorine-containing copolymer having a hydroxyl group.

This reason is that when the amount of the heatcurable agent is less than 1 part by weight, the fluorine-containing copolymer may be insufficiently cured, whereas when the amount exceeds 70 parts by weight, the storage stability of the curable composition for the low-refractive index film may be lowered.

(3) (c) Curing Catalyst

As the curing catalyst, those promoting a reaction between the hydroxyl group-containing polymer and the curing agent may be preferably used.

As such a curing catalyst, an organic acid, inorganic acid or salts of these acids and basic compounds may be used and organic acids such as paratoluenesulfonic acid, methanesulfonic acid, oxalic acid, formic acid and acetic acid, inorganic acids such as hydrochloric acid, phosphoric acid, nitric acid and sulfuric acid and ammonium salts of these acids may be exemplified.

Although no particular limitation is imposed on the amount of the curing catalyst to be added, the amount of the curing catalyst to be added is preferably in a range from 0.1 to 30 parts by weight when the total amount of the aforementioned fluorine-containing polymer having a hydroxyl group and the heatcurable agent having a functional group capable of reacting with a hydroxyl group is defined as 100 parts by weight.

This reason is that when the amount of the curing catalyst is less than 0.1 parts by weight, the effect obtained by the addition of the curing catalyst may not be developed, whereas when the amount of the curing catalyst exceeds 30 parts by weight, the storage stability of the curing composition for the low-refractive index film may be lowered.

(4) (d) Organic Solvent

As the organic solvent to be used in the curable composition for the low-refractive index film, the same type as the organic solvent to be used for the aforementioned curable composition is preferably used.

Also, the amount of the organic solvent is preferably designed to be in a range from 500 to 10,000 parts by weight based on 100 parts by weight of the fluorine-containing copolymer having a hydroxyl group.

This reason is that when the amount of such an organic solvent to be added is less than 500 parts by weight it may be difficult to form the low-refractive index film having a uniform film thickness, whereas when the amount exceeds 10,000 parts by weight, the storage stability of the curable composition for the low-refractive index film may be lowered.

(3) Refractive Index

The refractive index (refractive index of Na-D line, measured at 25° C.) of the low-refractive index film is preferably designed to be in a range from 1.35 to 1.50.

This reason is that when the refractive index is less than 1.35, an excessive restriction may be imposed on usable material types whereas the refractive index exceeds 1.5, the antireflecting effect may be significantly lowered in the case of combining the low-refractive index film with the high-refractive index film.

Also, from the above reason, the refractive index of the low-refractive index film is more preferably in a range from 1.35 to 1.45 and still more preferably in a range from 1.35 to 1.42.

In the case of arranging the low-refractive index film, a difference in refractive index between the low-refractive index film and the high-refractive index film is preferably designed to be 0.05 or more. This reason is that if the difference in refractive index between the low refractive index film and the high-refractive index film is less than 0.05, any synergetic effect of these antireflecting films may not be obtained and the antireflecting effect may be lowered on the contrary.

Also, from the above reason, a difference in refractive index between the low-refractive index film and the high-refractive index film is designed to be more preferably in a range from 0.1 to 0.5 and still more preferably in a range from 0.15 to 0.5.

(4) Film Thickness

Also, although no particular limitation is imposed on the film thickness of the low-refractive index film, it is preferably in a range from 0.05 to 1 $\mu$m.

This reason is that, when the film thickness of such a low-refractive index film is less than 0.05 $\mu$m, the antireflecting effect and the adhesion to the substrate may be lowered, whereas when the film thickness of the low-refractive film exceeds 1 $\mu$m, an optical interference may be generated and the antireflecting effect may be thereby lowered.

From the above reason, the film thickness is designed to be more preferably in a range from 0.05 to 0.5 $\mu$m and still more preferably in a range from 0.06 to 0.2 $\mu$m.

(5) Method for Formation

It is desirable that the high-refractive index film is coated with the curable composition for the low-refractive index film to form a coating film for the low-refractive index film.

Although no particular limitation is imposed on such a coating method, for example, coating methods such as a dipping method, spraying method, bar coating method, roll coating method, spin coating method, curtain coating method, gravure coating method, silk screen method or ink jet method may be used.

In succession, the coating film consisting of the curable composition for the low-refractive index film is preferably heat-cured because the composition is reacted with a part of the high-refractive index film whereby a firm coating film can be formed as a whole. In this case, the coating film is preferably heated at 30 to 200° C. for 0.1 to 180 minutes. This reason is that such a heating condition enables the preparation of an antireflecting film having excellent antireflecting properties more efficiently without impairing the substrate and the formed antireflecting film.

From the above reason, as to the heating condition, the coating film is heated more preferably at 50 to 160° C. for 0.2 to 120 minutes and still more preferably at 60 to 140° C. for 0.5 to 60 minutes.

11. High-refractive Index Film

In the antireflecting film of the present invention, a film obtained by curing the curable composition comprising the above-explained compounds (A-1) or (A-2) to (D) is used as the high refractive index film.

(1) Refractive Index

The refractive index (refractive index of Na-D line, measured at 25° C.) of the high-refractive index film is preferably designed to be in a range from 1.45 to 2.1.

This reason is that when the refractive index is less than 1.45, the antireflecting effect may be significantly lowered when the high-refractive index film is combined with the low-refractive index film, whereas the refractive index exceeds 2.1, an excessive restriction may be imposed on usable material.

Also, from the above reason, the refractive index of the high-refractive index film is designed to be more preferably in a range from 1.55 to 2.0 and still more preferably in a range from 1.6 to 1.9.

(2) Film Thickness

Although no particular limitation is imposed on the film thickness of the high-refractive index film, it is preferably in a range from 0.01 to 50 $\mu$m.

This reason is that when the film thickness of such a high-refractive index film is less than 0.01 $\mu$m, in the case of combining with the low-refractive index film, an antireflecting effect and adhesion to the substrate may be lowered and antiscratching properties of the low-refractive index film may be lowered. When the film thickness of the high-refractive film exceeds 50 $\mu$m, the high-refractive index film may have large photoabsorption, decreasing the light transmittance.

From the above reason, the film thickness is designed to be preferably in a range from 0.02 to 10 $\mu$m, more preferably in a range from 0.05 to 2 $\mu$m and still more preferably 0.05 to 0.2 $\mu$m.

(3) Method for Formation

After a coating film for the high-refractive index film is formed, it is cured according to the aforementioned method concerning the curing of the curable composition.

In the process for the formation of the high-refractive index film, the high-refractive index film may be formed either at a time by single application or in parts by plural separate applications.

12. Hard Coat Layer

The provision of a hardcoat layer enables the high-refractive index film to be secured firmly. Also, this improves the antiscratching properties of the low-refractive index film.

Although there is no particular limitation to the structural material of the hardcoat layer, examples of the structural material may include single products or combinations of a siloxane resin, acrylic resin, melamine resin and epoxy resin. Among these resins, examples of the structural materials having high hardness may include heatcurable type hardcoat compositions obtained by reacting an alkylalkoxysilane with colloidal silica in a hydrophilic solvent as described in JP-A-63-117074, ultraviolet-curable hardcoat compositions in which reactive silica particles are dispersed as described in JP-A-9-100111 and known ultraviolet-curable hardcoat composition comprising, as major components, urethane acrylate and a polyfunctional acrylate.

Also, the film thickness of the hardcoat layer is designed to be preferably in a range from 0.1 to 50 µm.

This reason is that when the film thickness of the hardcoat layer is less than 0.1 µm, it may be difficult that the low-refractive index film is firmly secured, whereas when the film thickness exceeds 50 µm, the production of the hardcoat layer may be difficult and the bending properties may be lowered when the antireflecting film is used for film applications.

Also, from the above reason, the film thickness of the hardcoat layer is designed to be preferably in a range from 0.5 to 30 µm and more preferably in a range from 1 to 20 µm.

13. Substrate

Although no particular limitation is imposed on the type of substrate on which the high-refractive index film is disposed, examples of the substrate material may include substrates made of a polyester resin, triacetyl cellulose resin, polycarbonate resin, allylcarbonate resin, polyether sulfone resin, polyacrylate resin, norbornane resin, acrylstyrene resin or glass.

For instance, the antireflecting film made to comprise each of these substrates ensures that not only superior antiscratching properties and transparency as well as an antireflecting effect but also high mechanical strength and durability can be obtained in a wide field of applications for antireflecting films such as lens portions of cameras, image display portions of televisions (CRT) and color filters of liquid crystal display devices.

Also, for example, if the antireflecting film is used as a gas barrier material comprising each of these substrates, the effect of stabilizing the performance of a polarizing film is obtained due to a gas barrier effect in a field of applications such as polarizing films for liquid crystal display panels using a transparent substrate such as triacetyl cellulose having a hygroscopic problem. Also, the long term durability of a solar panel which tends to be deteriorated by moisture and oxygen is bettered. In addition to these effects, superior antiscratching properties and transparency are obtained and also high mechanical strength and durability can be obtained.

EXAMPLES

Examples of the present invention will be hereinafter explained in detail, however, the scope of the present invention is not limited by these examples.

Production Example 1

Preparation of a Curable Composition for a Low-refractive Index Film (First Layer)

(1) Preparation of a Fluorine-containing Copolymer having a Hydroxyl Group

The atmosphere in a stainless autoclave having an internal volume of 1.5 l and equipped with an electromagnetic stirrer was thoroughly replaced by nitrogen gas. The autoclave was charged with 500 g of ethyl acetate, 34.0 g of ethyl vinyl ether (EVE), 41.6 g of hydroxyethyl vinyl ether (HEVE), 75.4 g of perfluoropropyl vinyl ether (FPVE), 1.3 g of lauroyl peroxide, 7.5 g of a silicon-containing high molecular azo initiator (trademark: VPS1001, manufactured by Wako Pure Chemical Industries, Ltd.) and 1 g of a reactive emulsion (trademark: NE-30, manufactured by Asahi Denka Kogyo K. K.), the mixture was cooled to −50° C. using dry ice-methanol and oxygen in the system was eliminated again by replacing with nitrogen gas.

Next, 119.0 g of hexafluoropropylene (HFP) was further charged and the temperature was started to rise. The pressure in the autoclave when the temperature therein reached 70° C. showed $5.5 \times 10^5$ Pa. After that, the reaction was continued at 70° C. for 20 hours. When the pressure was dropped to $2.3 \times 10^5$ Pa, the autoclave was water-cooled to terminate the reaction. After the reaction mixture was reached to ambient temperature, the unreacted monomer was discharged and the autoclave was opened to obtain a polymer solution having a solid concentration of 30.0% by weight. The resulting polymer solution was poured into methanol to precipitate the polymer, which was further washed with methanol and dried at 50° C. under vacuum to obtain 170 g a fluorine-containing copolymer having a hydroxyl group.

The intrinsic viscosity (using N,N-dimethylacetamide solvent and measured at 25° C.) of the resulting fluorine-containing copolymer having a hydroxyl group was measured, to find that the viscosity was 0.28 dl/g.

Also, the glass transition temperature of the fluorine-containing copolymer was measured using DSC at a temperature rise rate of 5° C./min in a nitrogen stream, to find that the transition temperature was 31° C.

Also, the fluorine content of the fluorine-containing copolymer was measured using an Alizarin Complexon method, to find that it was 51.7%.

Moreover, the hydroxyl group value of the fluorine-containing copolymer was measured by an acetyl method using acetic acid anhydride, to find that the hydroxyl group value was 102 mg KOH/g.

(2) Preparation of the Curable Composition

In a container equipped with a stirrer, 100 g of the fluorine-containing copolymer having a hydroxyl group which was obtained in (1), 11.1 g of Cymel 303 (alkoxy methylmelamine compound, manufactured by Mitsui Cyteck Ltd.) and 3,736 g of methyl isobutyl ketone (hereinafter referred to as MIBK) were respectively compounded and the mixture was stirred at 110° C. for 5 hours to react the fluorine-containing copolymer having a hydroxyl group with Cymel 303.

Next, 11.1 g of Catalyst 4040 (manufactured by Mitsui Cyteck Ltd., solid concentration: 40% by weight) was further added and the resulting mixture was stirred for 10 minutes to obtain a curable composition for a low-refractive index film (hereinafter called a coating solution A as the case may be) having a viscosity of 1 mPa·s (measured at 25° C.).

Next, the refractive index of the low-refractive index film obtained from the resulting curable composition for a low-refractive index film was measured as follows.

First, the curable composition for a low-refractive index film was applied to a silicon wafer (film thickness: 1 µm) by using a wire bar coater (#3) and air-dried at ambient temperature for 5 minutes to form a coating film.

Then, the coating film was heat-cured using an oven in the following heating condition: 140° C. and one minute, to form a low-refractive index film having a film thickness of 0.3 µm. Then, the refractive index of Na-D line in the resulting low-refractive index film was measured at 25° C. by using a spectral elipsometer. As a result, the refractive index was 1.40.

Production Example 2
Preparation of a Curable Composition for a High-refractive Index Film (Second Layer)
(1) Preparation of a Needle-like Antimony-containing Tin Oxide (Compound (A-1)) Sol 300 parts by weight of a needle-like antimony-containing tin oxide (compound (A-1)) powder (FS-12P, manufactured by Ishihara Techno Corp.) was added to 700 parts by weight of methyl ethyl ketone (hereinafter abbreviated as MEK) and dispersed using glass beads for 10 hours. Then, the glass beads were removed to obtain 950 parts by weight of a MEK needle-like antimony-containing tin oxide sol (hereinafter called a needle-like ATO sol as the case may be). Here, 2 g of the resulting needle-like ATO sol was weighed on an aluminum pan and dried on a 120° C. hot plate for one hour to measure the total solid concentration, to find that it was 30% by weight.

(2) Preparation of a (Reactive) Needle-like Antimony-containing Tin Oxide (Compound (A-2)) Sol with which an Organic Compound having a Polymerizable Unsaturated Group is Bound (2-1) Synthesis of an Organic Compound having a Polymerizable Unsaturated Group To a mixed solution of 7.8 g of mercaptopropyltrimethoxysilane and 0.2 g of dibutyltin dilaurate was added dropwise 20.6 g of isophoronediisocyanate at 50° C. over one hour in dry air and further the mixture was stirred at 60° C. for 3 hours.

In succession, 71.4 g of pentaerythritol triacrylate (trademark: NK Ester A-TMM-3L, manufactured by Shin-Nakamura Chemical Co., Ltd.) was added dropwise to the reaction solution at 30° C. over an hour and further the mixture was stirred at 60° C. for 3 hours to obtain a reaction solution.

The amount of the residual isocyanate in the product contained in the reaction solution, namely, the organic compound having a polymerizable unsaturated group was measured by FT-IR, to find that it was 0.1% by weight and it was thereby confirmed that each reaction was run almost quantitatively. Also, it was confirmed that there were a thiourethane bond, a urethane bond, an alkoxysilyl group and a polymerizable unsaturated group in its molecule.

(2-2) Synthesis of a Reactive Needle-like Antimony-containing Tin Oxide Sol

In a container equipped with a stirrer, 95 g of a needle-like antimony-containing tin oxide dispersion (FSS-10M manufactured by Ishihara Techno Corp., dispersion solvent: MEK, total solid concentration: 30% by weight), 4.0 g of the organic compound obtained by the method (2-1) having a polymerizable unsaturated group, 0.1 g of distilled water and 0.01 g of p-hydroxyphenyl monomethyl ether were mixed and the mixture was stirred under heating at 65° C. After 5 hours, 0.7 g of methyl orthoformate was added to this mixture, which was further heated for one hour to obtain a reactive needle-like antimony-containing tin oxide sol (hereinafter called a reactive needle-like ATO sol as the case may be). Here, 2 g of the resulting reactive needle-like ATO sol was weighed on an aluminum pan and dried on a 120° C. hot plate for one hour to measure the total solid concentration, to find that the total solid concentration was 33% by weight. Also, 2 g of this reactive needle-like ATO sol was weighed in a crucible, pre-dried on an 80° C. hot plate for 30 minutes and then baked in a 750° C. muffle furnace for one hour. Then the content of the inorganic materials in all solids was measured from the amount of the resulting inorganic residue and the total solid concentration, to find that the content of the inorganic materials was 79% by weight. It is to be noted that the content of the inorganic materials measured in this measuring method corresponds to the content of ATO in all solids.

(3) Synthesis of a Mixture of a Reaction Product (Compound (B)) of a Hydroxyl Group-containing Polyfunctional (meth)acrylate and a Diisocyanate and a Polyfunctional (meth)acrylate (Compound (C)) (No. 1)

94.0 g of dipentaerythritol pentaacrylate (hydroxyl group-containing polyfunctional (meth)acrylate) (trademark: KAYARAD DPHA dipentaerythritol pentaacrylate/dipentaerythritol hexaacrylate (hereinafter called C-1)=4/6, manufactured by Nippon Kayaku Co., Ltd.) was added dropwise to a mixed solution of 6.0 g of hexamethylenediisocyanate and 0.02 g of dibutyltin dilaurate at 20° C. in dry air for one hour and the mixture was then stirred for one hour at room temperature and further stirred under heating at 60° C. for 3 hours to obtain a mixture (hereinafter referred to as M-1) of a reaction product (hereinafter referred to as B-1) of dipentaerythritol pentaacrylate and hexamethylenediisocyanate and C-1. Here, the amount of the residual isocyanate in the reaction solution was analyzed, to find that the residual amount was 0.1% by weight or less and it was thereby confirmed that the reaction was run almost quantitatively. Also, the content of B-1 in M-1 was calculated from the charge rate of raw material, to find that it was 44%.

(4) Synthesis of a Mixture of a Reaction Product (Compound (B)) of a Hydroxyl Group-containing Polyfunctional (meth)acrylate and a Diisocyanate and a Polyfunctional (meth)acrylate (Compound (C)) (No. 2)

0.1 g of dibutyltin laurate was added to a mixed solution of 40.9 g of pentaerythritol acrylate (hydroxyl group-containing polyfunctional (meth)acrylate) (trademark: NK Ester A-TMM-3L pentaerythritol triacrylate/pentaerythritol tetraacrylate (hereinafter referred to as C-2)=6/4, manufactured by Shin-Nakamura Chemical Co., Ltd.) and 18.3 g of isophoronediisocyanate in dry air and the mixture was then stirred for one hour at room temperature and further stirred under heating at 50° C. for 3 hours. Further 40.9 g of pentaerythritol triacrylate was added dropwise over one hour and the resulting mixture was stirred at 60° C. for 3 hours to obtain a mixture (hereinafter referred to as M-2) of a reaction product (hereinafter referred to as B-2) of pentaerythritol triacrylate and isophoronediisocyanate and C-2. Here, the amount of the residual isocyanate in the reaction solution was analyzed, to find that the residual amount was 0.1% by weight or less and it was thereby confirmed that the reaction was run almost quantitatively. Also, the content of B-2 in M-2 was calculated from the charge rate of raw material, to find that it was 67%.

(5) Preparation of the Curable Composition Comprising the Aforementioned Compounds (A-1) or (A-2) to (D)

In a container shielded from ultraviolet rays, 190 g (57.0 g as a needle-like ATO fine particles) of the aforementioned needle-like ATO (A-1) sol, 28.9 g (12.7 g as B-1 and 16.2 g as C-1) of the above mixture (M-1), 10.6 g (7.1 g as B-2 and 3.5 g as C-2) of the above mixture (M-2), 3.5 g of 1-hydroxycyclohexyl phenyl ketone (hereinafter referred to as D-1) and 37 g of MEK were respectively compounded and the mixture was stirred at 50° C. for 2 hours to obtain a uniform solution of a high-refractive index film curable composition 1 (hereinafter called a coating solution B as the case may be). The total solid concentration of this curable composition and the content of inorganic materials in all solids, which were measured in the same manner as above, were 37% by weight and 57% by weight respectively.

Further, the needle-like ATO (A-1) sol or the reactive needle-like ATO (A-2) sol and the compounds (B) to (D)

were compounded according to the proportions shown in Table 1 to prepare curable compositions 2 to 6 for a high-refractive index film. It is to be noted that in the composition 4, the mixture (M-2) was added and trimethylolpropane triacrylate (hereinafter referred to as C-3) was further added for the compounds (B) and (C). In the case of the composition 6, each compound was mixed in the same manner as in the production of the composition 1 and then the mixture was concentrated using a rotary evaporator until the total solid concentration reached 52% by weight to obtain a curable composition.

Also, the total solid concentration of this curable composition and the content of inorganic materials in all solids were measured in the same manner as above.

Comparative Production Example 1

Preparation of a Comparative Curable Composition for a High-refractive Index Film (1) Preparation of a Globular Antimony-containing Tin Oxide Sol 300 parts by weight of a globular antimony-containing tin oxide fine powder (SN-102P, manufactured by Ishihara Techno Corp.) was added to 700 parts by weight of MEK and dispersed using glass beads for 10 hours. Then, the glass beads were removed to obtain 950 parts by weight of a MEK globular antimony-containing tin oxide sol (hereinafter called a globular ATO sol as the case may be). Here, 2 g of the resulting globular ATO sol was weighed on an aluminum pan and dried on a 120° C. hot plate for one hour to measure the total solid concentration, to find that it was 30% by weight.

(2) Preparation of the Curable Composition Comprising the Globular ATO Sol or the Needle-like ATO (A-1) Sol and the Compounds (B) to (D)

The globular ATO sol or the needle-like ATO sol and the compounds (B) to (D) were compounded according to the proportions shown in Table 1 to prepare comparative curable compositions 1 to 6 for high-refractive index films in the same manner as in the Production Example 2(5). It is to be noted that in the case of the comparative composition 4, the mixture of each component was concentrated in the same manner as in the production of the composition 6 to obtain a curable composition.

Also, the total solid concentration in the composition and the content of inorganic materials in all solids were measured in the same manner as in Production Example 2.

Production Example 3

Preparation of the Hardcoat Material

A mixed solution consisting of 8.7 g of reactive alkoxysilane, 91.3 g of methyl ethyl ketone dispersion silica sol (trademark: MEK-ST, manufactured by Nissan Chemical Industries, Ltd., average particle diameter: 22 nm, silica concentration: 30% by weight), 0.2 g of isopropyl alcohol and 0.1 g of ion exchange water was stirred at 80° C. for 3 hours in dry air. 1.4 g of methyl orthoformate was then added to the reaction solution and the mixture was further stirred at the same temperature for one hour.

After the reaction solution was cooled to ambient temperature, 21.9 g of trimethylolpropane triacrylate (trademark: NK Ester A-TMPT, manufactured by Shin-Nakamura Chemical Co., Ltd.), 10.95 g of trimethylolpropanetrioxyethyl acrylate (trademark: NK Ester A-TMPT-3EO, manufactured by Shin-Nakamura Chemical Co., Ltd.) and 3.27 g of 1-hydroxycyclohexyl phenyl ketone (trademark: IRGACURE 184, manufactured by Ciba Specialty Chemicals K. K.) were mixed to prepare a hardcoat composition (hereinafter called a coating solution C as the case may be).

Example 1

(1) Production of an Antireflecting Film

The coating solution C obtained in Production Example 3 was applied to a Polyester Film A4300 (substrate) (manufactured by Toyobo Co., Ltd., film thickness: 188 µm) by using a wire bar coater (#12) and dried at 80° C. for one minute in an oven to form a coating film. Then, using a metal halide lamp, the coating film was cured by ultraviolet rays in right-radiation condition of 0.3 J/cm$^2$ in an atmosphere to form a hardcoat layer having a film thickness of 10 µm and a refractive index of 1.49.

Next, the coating solution B of the composition 1 obtained in Production Example 2 was applied to the hardcoat layer by using a wire bar coater (#3). At this time, the coating solution B was diluted with methyl isobutyl ketone until the total solid concentration in the composition reached 5% by weight. It is to be noted that the curable composition corresponding to the composition 3 was applied without diluting with methyl isobutyl ketone. Next, the applied solution was dried at 80° C. for one minute in an oven to form a coating film. Then, using a metal halide lamp, the coating film was cured by ultraviolet rays in right-radiation condition of 0.3 J/cm$^2$ in an atmosphere to form a high-refractive index film (second layer) having a film thickness of 0.05 µm and a refractive index of 1.68.

Further, the coating solution A obtained in Production Example 1 was applied to the high-refractive index film by using a wire bar coater (#3) and air-dried at ambient temperature for 5 minutes to form a coating film. This coating film was heated at 140° C. for one minute by using an oven to form a low-refractive index film (first layer) having a film thickness of 0.05 µm and a refractive index of 1.40.

Examples 2 and 3

The same procedures as in Example 1 were conducted except that the compositions 2 and 3 prepared in Production Example 2 were respectively used in place of the composition 1 (coating solution B) prepared in Production Example 2, to produce laminates.

Comparative Examples 1 to 3

The same procedures as in Example 1 were conducted except that the comparative compositions 1 to 3 prepared in Comparative Production Example 1 were respectively used in place of the composition 1 (coating solution B) prepared in Production Example 2, to produce laminates.

Reference Test Example

The compositions 1 to 6 prepared in Production Example 2 and the comparative compositions 1 to 6 prepared in Comparative Production Example 1 were respectively cured in the same manner as in Example 1 to measure the surface resistance of each cured product by using a measuring method as shown below. Also, the adhesiveness of the resulting cured product, the adhesiveness of the cured product after QUV and the antiscratching properties of the cured product were evaluated according to the following standards.

(1) Surface Resistance

The surface resistance (Ω/□) of the cured product filmed on a PET-untreated surface by using a high-resistance meter (HP4339, manufactured by Hewlett-Packard Company) in the following condition: major electrode diameter: 26 mmΦ and applied voltage: 100 V. The obtained results are shown in Table 1.

(2) Adhesiveness and Adhesiveness after QUV

The adhesiveness of the cured product filmed on the surface treated for PET-easy-adhesion was evaluated by a film residual rate (%) on total 100 cross-cuts with 1 mm square according to a cross-cut cellophane tape adhesion test of JIS K5400.

Further, the cured product film was irradiated with ultraviolet rays for 150 hours by using a QUV accelerated weathering test (manufactured by Q-Panel Lab Products) and then the adhesiveness was evaluated in the same manner. The results are shown in Table 1.

It is to be noted that the adhesiveness contributes to the antiscratching properties of the laminate and the adhesiveness after QUV contributes to an improvement in the durability of the laminate.

(3) Antiscratching Properties

The surface of the cured product filmed on the surface treated for PET-easy-adhesion was rubbed with #0000 steel wool ten times at a load of 40 g/cm$^2$ to evaluate the antiscratching properties of the cured product visually according to the following standard. The obtained results are shown in Table 1.

Criterion 5: No generation of scratches was observed at all.
Criterion 4: The generation of 1 to 5 scratches was observed.
Criterion 3: The generation of 6 to 50 scratches was observed.
Criterion 2: The generation of 51 to 100 scratches was observed.
Criterion 1: The peeling of the coating film was observed.

The level of antiscratching properties higher than the criterion 3 is practically allowable level, the level of antiscratching properties higher than the criterion 4 is preferable because the practical durability is superior and the level of antiscratching properties higher than the criterion 5 is more preferable because the practical durability is significantly improved.

| | Composition for a high-refractive index film | | | | | | Comparative composition for a high-refractive index film | | | | | |
|---|---|---|---|---|---|---|---|---|---|---|---|---|
| | 1 | 2 | 3 | 4 | 5 | 6 | 1 | 2 | 3 | 4 | 5 | 6 |
| Compound (A-1) or (A-2) | | | | | | | | | | | | |
| Needle-like ATO (A-1) sol | 57.0 | 74.9 | 49.9 | — | — | 40.0 | — | — | — | — | 30.0 | 57.0 |
| Reactive needle-like ATO (A-2) sol | — | — | — | 75.0 | 67.0 | — | — | — | — | — | — | — |
| Globular ATO sol | — | — | — | — | — | — | 57.0 | 74.9 | 49.9 | 40.0 | — | — |
| Content of inorganic materials in all solids | 57.0 | 74.9 | 49.9 | 59.0 | 53.0 | 40.0 | 57.0 | 74.9 | 49.9 | 40.0 | 30.0 | 57.0 |
| Compound (B) | | | | | | | | | | | | |
| B-1 | 12.7 | 6.9 | 15.0 | — | 9.0 | 18.2 | 12.7 | 6.9 | 15.0 | 18.2 | — | 8.1 |
| B-2 | 7.1 | 3.9 | 8.4 | 12.0 | 5.0 | 10.2 | 7.1 | 3.9 | 8.4 | 10.2 | 44.6 | 4.5 |
| Polyfunctional (meth)acrylate (C) | | | | | | | | | | | | |
| C-1 | 16.2 | 8.8 | 19.1 | — | 11.5 | 23.1 | 16.2 | 8.8 | 19.1 | 23.1 | — | 10.2 |
| C-2 | 3.5 | 1.9 | 4.1 | 5.9 | 2.5 | 5.0 | 3.5 | 1.9 | 4.1 | 5.0 | 21.9 | 2.2 |
| C-3 | — | — | — | 2.1 | — | — | — | — | — | — | — | — |
| Photoinitiator (D) | | | | | | | | | | | | |
| D-1 | 3.5 | 3.5 | 3.5 | 3.5 | 3.5 | 3.5 | 3.5 | 3.5 | 3.5 | 3.5 | 3.5 | 12.6 |
| D-2 | — | — | — | 1.5 | 1.5 | — | — | — | — | — | — | 5.4 |
| Organic solvent | | | | | | | | | | | | |
| MEK | 170.0 | 174.8 | 1900.0 | 170.0 | 170.0 | 92.3 | 170.0 | 174.8 | 1900.0 | 92.3 | 170.0 | 170.0 |
| MIBK | — | — | — | 42.5 | — | — | — | — | — | — | — | — |
| Toluene | — | — | — | — | 42.5 | — | — | — | — | — | — | — |
| Total | 270.0 | 274.8 | 2000.0 | 312.5 | 312.5 | 192.3 | 270.0 | 274.8 | 2000.0 | 192.3 | 270.0 | 270.0 |
| Total solid concentration (wt %) | 37 | 36 | 5 | 32 | 32 | 52 | 37 | 26 | 5 | 52 | 37 | 37 |
| Qualities of the cured product | | | | | | | | | | | | |
| Surface resistance ($\Omega/\square$) | $8 \times 10^8$ | $3 \times 10^8$ | $4 \times 10^{11}$ | $8 \times 10^7$ | $1 \times 10^8$ | $2 \times 10^{14}$ | $3 \times 10^{14}$ | $2 \times 10^9$ | $8 \times 10^{14}$ | $9 \times 10^{14}$ | $1 \times 10^{15}$ | $2 \times 10^8$ |
| Adhesiveness (%) | 100 | 100 | 100 | 100 | 100 | 100 | 100 | 100 | 100 | 100 | 100 | 100 |
| Adhesiveness after QUV (%) | 100 | 100 | 100 | 100 | 100 | 100 | 100 | 100 | 100 | 100 | 100 | 30 |
| Antiscratching properties | 4 | 4 | 4 | 5 | 5 | 4 | 4 | 2 | 3 | 3 | 2 | 2 |

*Each value of the needle-like ATO sol, the reactive needle-like ATO sol and the globular ATO sol indicates a dry weight (excluding organic solvents) of a fine powder contained in the charge amount of each dispersion sol.

-continued

|  | Composition for a high-refractive index film | | | | | | Comparative composition for a high-refractive index film | | | | | |
|---|---|---|---|---|---|---|---|---|---|---|---|---|
|  | 1 | 2 | 3 | 4 | 5 | 6 | 1 | 2 | 3 | 4 | 5 | 6 |

The abbreviations in Table 1 are as follows.
B-1: A reaction product between the hydroxyl group-containing polyfunctional (meth)acrylate and hexamethylenediisocyanate which were synthesized in Production Example 2.
B-2: A reaction product between the hydroxyl group-containing polyfunctional (meth)acrylate and isophoronediisocyanate which were synthesized in Production Example 2.
C-1: Dipentaerythritol hexaacrylate.
C-2: Pentaerythritol tetraacrylate.
C-3: Trimethylolpropane triacrylate.
D-1: 1-Hydroxycyclohexyl phenyl ketone.
D-2: 2-methyl-1-[4-(methylthio)phenyl]-2-morphorino-1-propanone.
MEK: Methyl ethyl ketone.
MIBK: Methyl isobutyl ketone

Test Example

The antiscratching properties of the antireflecting films obtained in Examples 1 to 3 and Comparative Examples 1 to 3 were evaluated according to the following standard.

Also, the surface resistance, reflectance, all-ray transmittance and turbidity (haze value) of the resulting antireflecting film were measured using the measuring method shown below.

(1) Antiscratching Properties

The surface of the resulting antireflecting film was rubbed 30 times with #0000 steel wool at a load of 200 g/cm² to evaluate the antiscratching properties of the antireflecting film visually based on the same standard as in Reference Test Example. The obtained results are shown in Table 2.

(2) Reflectance and All-ray Transmittance

The reflectance (minimum reflectance at a measuring wavelength) and all-ray transmittance of the resulting antireflecting film were measured at a wavelength ranging from 340 to 700 nm by using a spectral reflectometer (magnetic spectrophotometer U-3410 into which a large sample room integrating sphere attached device 150-09090, manufactured by Hitachi, ltd.) according to JIS K7105 (Measuring method A).

Specifically, using the reflectance of an aluminum deposition film as a standard (100%), the minimum reflectance and all-ray transmittance of the antireflecting film at each wavelength were measured. The results are shown in Table 2.

(3) Turbidity (Haze Value)

The haze value of the resulting antireflecting film was measured using a color haze meter (manufactured by Suga Seisakusho Co., Ltd.) according to ASTM D1003. The obtained results are shown in Table 2.

(4) Surface Resistance

The surface resistance ($\Omega/\square$) of the resulting antireflecting laminate was measured in the same manner as in Reference Test Example. The obtained results are shown in Table 2.

|  | Example | | | Comparative Example | | |
|---|---|---|---|---|---|---|
|  | 1 | 2 | 3 | 1 | 2 | 3 |
| First layer (low-refractive index layer) | Production Example 1 | Production Example 1 | Production Example 1 | Production Example 1 | Production Example 1 | Production Example 1 |
| Second layer (high-refractive index layer) | Production Example 2 Composition 1 | Production Example 2 Composition 2 | Production Example 2 Composition 3 | Comparative Production Example 1 Comparative Composition 1 | Comparative Production Example 1 Comparative Composition 2 | Comparative Production Example 1 Comparative Composition 3 |
| Refractive index of the cured product | 1.65 | 1.68 | 1.64 | 1.65 | 1.68 | 1.64 |
| Third layer (hardcoat layer) | Production Example 4 | Production Example 4 | Production Example 4 | Production Example 4 | Production Example 4 | Production Example 4 |
| Evaluation of the laminate Antiscratching properties | 5 | 5 | 4 | 5 | 5 | 4 |
| Reflectance (%) | 0.3 | 0.1 | 0.4 | 0.3 | 0.1 | 0.4 |
| All-ray transmittance (%) | 93 | 93 | 93 | 93 | 93 | 93 |
| Turbidity (%) | 1.3 | 1.3 | 1.3 | 1.3 | 1.3 | 1.3 |
| Surface resistance ($\Omega/\square$) | $10^9$ | $10^9$ | $10^{11}$ | $10^{15}$ | $10^{10}$ | $10^{15}$ |

The invention is based on Japanese Patent Application No. 2001-098113, which is herein incorporated by reference. It is to be understood by those skilled in the art that the forgoing description relates to preferred embodiments of the invention and that various changes and modifications may be made in the invention without departing from the spirit and scope of the appended claims. Also it is to be understood that the invention is not limited to the embodiments thereof except as defined in the appended claims.

What is claimed is:

1. A laminate comprising:
a first layer formed on the outermost side, and
a second layer formed under said first layer, said second layer comprising a needle-like antimony-containing tin oxide having an aspect ratio of 5 or more,
wherein said second layer is a cured product prepared by curing a curable composition comprising the following compounds (A-1) to (D), wherein the total solid concentration in all solids of the composition is 0.5 to 75%:

(A-1) 40 to 80% by weight of the needle-like antimony-containing tin oxide;

(B) 5 to 40% by weight of a reaction product of a hydroxyl group-containing polyfunctional (meth)acrylate having at least two (meth)acryloyl groups and a diisocyanate;

(C) 5 to 30% by weight of a polyfunctional (meth)acrylate having at least two (meth)acxyloyl groups; and (D) 0.5 to 10% by weight of a photoinitiator.

2. The laminate according to claim 1, wherein the needle-like antimony-containing tin oxide is a surface-treated needle-like antimony-containing tin oxide and the composition comprises (A-2) 40 to 89.5% by weight of the surface-treated needle-like antimony-containing tin oxide.

3. The laminate according to claim 2, wherein the surface-treated needle-like antimony-containing tin oxide is obtained by combining said needle-like antimony-containing tin oxide with an organic compound having polymerizable unsaturated groups.

4. The laminate according to claim 3, wherein said compound (D) comprises 1-hydroxycyclohexyl phenyl ketone.

5. The laminate according to claim 2, wherein said compound (D) comprises 1-hydroxycyclohexyl phenyl ketone.

6. The laminate according to claim 1, wherein said compound (D) comprises 1-hydroxycyclohexyl phenyl ketone.

7. An antirefiecting film comprising the laminate according to claim 1, wherein said first layer is a low-refractive index film with a refractive index of 1.35 to 1.42 which comprises a compound containing a fluorine atom and said second layer is a high-refractive index film with a refractive index of 1.6 to 1.9.

8. The laminate of claim 1 wherein the laminate is transparent.

9. The laminate of claim 1, having a surface resistance lower than $10^{12}$ Ω/□.

10. The laminate of claim 1, wherein the surface resistance is less than $10^{10}$ Ω/□.

11. The laminate of claim 1, wherein the first layer comprises polymerized units of a compound containing a fluorine atom.

12. The laminate of claim 1, wherein the first layer has a low-refractive index and the second layer has a high refractive index.

13. The laminate according to claim 1, wherein the first layer comprises a fluorine-containing copolymer having a hydroxyl group.

14. The laminate according to claim 1, wherein the second layer comprises reacted units of an isocyanate and an acrylate.

15. The laminate according to claim 1, wherein the difference in the refractive index between the first layer and the second layer is 0.05 or more.

16. The laminate according to claim 1, wherein the difference in the refractive index between the first layer and the second layer is from 0.15 to 0.5.

17. The laminate according to claim 1, wherein the first layer has a thickness of from 0.05 to 1 μm.

18. The laminate according to claim 1, wherein the second layer has a thickness of from 0.01 to 50 μm.

19. The laminate according to claim 1, wherein the second layer has a thickness of from 0.05 to 0.2 μm.

20. The laminate according to claim 1, wherein the hydroxyl group-containing polyfunctional (meth)acrylate is a monomer.

21. The laminate according to claim 1, wherein the hydroxyl group-containing polyfunctional (meth)acrylate is at least one selected from the group consisting of dipentaerythritol penta(meth)acrylate, pentaerythritol tri(meth)acrylate, pentaerythritol di(meth)acrylate monostearate, dipentaerythritol hexaacrylate, and a bis(acryloyloxyethyl) hydroxyethylisocyanurate.

22. The laminate according to claim 1, wherein (B) has a molecular weight per (meth)acryloyl group of 400 or less.

23. The laminate according to claim 1, wherein (B) has the following formula:

wherein $R^1$ and $R^3$ independently represent a monovalent organogroup having at least two (meth)acryloyl groups.

* * * * *